United States Patent
Tozzo et al.

(10) Patent No.: US 12,436,545 B2
(45) Date of Patent: Oct. 7, 2025

(54) SYSTEM AND METHOD FOR AUTONOMOUSLY POSITIONING A CAMERA OF A SEWER INSPECTION AND/OR MAINTENANCE SYSTEM

(71) Applicant: iPEK International GmbH, Sulzberg (DE)

(72) Inventors: Fabrizio Tozzo, Wolfertschwenden (DE); Rajeesh Kumar, Kempten (DE); Muhammad Talha, Durach (DE)

(73) Assignee: iPEK International GmbH, Sulzberg (DE)

( * ) Notice: Subject to any disclaimer, the term of this patent is extended or adjusted under 35 U.S.C. 154(b) by 0 days.

(21) Appl. No.: 18/658,566

(22) Filed: May 8, 2024

(65) Prior Publication Data

US 2024/0377844 A1 Nov. 14, 2024

(30) Foreign Application Priority Data

May 9, 2023 (DE) ............ 10 2023 112 077.8

(51) Int. Cl.
G05D 1/689 (2024.01)
G05D 105/80 (2024.01)
H04N 23/695 (2023.01)

(52) U.S. Cl.
CPC ......... G05D 1/6895 (2024.01); H04N 23/695 (2023.01); G05D 2105/89 (2024.01)

(58) Field of Classification Search
CPC .. G01B 11/26; G05D 1/6895; G05D 2105/89; H04N 23/695; G01N 21/954

(Continued)

(56) References Cited

U.S. PATENT DOCUMENTS

| | | | | |
|---|---|---|---|---|
| 6,003,376 A | * | 12/1999 | Burns | G01S 3/808 73/584 |
| 6,684,351 B1 | * | 1/2004 | Bendak | H04L 1/244 714/739 |
| 7,174,101 B2 | * | 2/2007 | Yon | H04Q 11/0005 398/45 |

FOREIGN PATENT DOCUMENTS

| | | |
|---|---|---|
| DE | 102005044574 A1 | 3/2007 |
| DE | 202013100437 U1 | 2/2013 |

(Continued)

OTHER PUBLICATIONS

The extended European Search Report with written opinion issued by the European Patent Office for European Patent Application No. 24174965.4-1001 dated Oct. 17, 2024, with English translation attached.

(Continued)

*Primary Examiner* — Jamie J Atala
(74) *Attorney, Agent, or Firm* — Myers Wolin, LLC

(57) ABSTRACT

A sewer inspection or maintenance system is provided having a sensor system with which at least three distances between a predetermined first point in the sewer pipe and the sewer wall of the sewer pipe are detected. The system has a processing unit adapted for determining a diameter of the sewer pipe and a predetermined second point in the sewer pipe based on the detected distances, and for determining a horizontal offset and a vertical offset between the predetermined first point and the predetermined second point based on the determined diameter and the detected distances. The system also has a positioning unit which is adapted to correct the position of an inspection unit in the sewer pipe by the two offsets. A corresponding method is provided as well.

10 Claims, 4 Drawing Sheets

(58) Field of Classification Search
USPC .......................................................... 348/48
See application file for complete search history.

(56) References Cited

FOREIGN PATENT DOCUMENTS

| | | |
|---|---|---|
| DE | 102012107727 A1 | 9/2013 |
| DE | 102012204498 A1 | 9/2013 |
| DE | 202014007542 U2 | 1/2016 |
| GB | 2573757 A | 11/2019 |

OTHER PUBLICATIONS

Examination Notice issued by the German Patent and Trademark Office for File No. 102023 112077.8, dated Jan. 24, 2024, with English translation attached.

* cited by examiner

SYSTEM AND METHOD FOR AUTONOMOUSLY POSITIONING A CAMERA OF A SEWER INSPECTION AND/OR MAINTENANCE SYSTEM

CROSS REFERENCE TO RELATED APPLICATIONS

This application claims priority to German Patent Application No. 10 2023 112 077.8, filed May 9, 2023, the contents of which are incorporated by reference herein.

FIELD OF THE INVENTION

The invention relates to a sewer inspection and/or maintenance system that is adapted to autonomously position a camera in a sewer pipe. The invention also relates to a correspondingly designed method.

BACKGROUND OF THE INVENTION

In sewer inspection and/or maintenance systems, image recording devices (cameras or video cameras) are used to record the inside of a pipe or sewer. In the following, image recording device, camera and video camera are referred to collectively as "camera." It is advantageous here if the camera is arranged in the center of the pipe in order to obtain optimum inspection results.

With conventional pipe inspection systems, the arrangement of the camera in the center of the pipe is carried out manually. For example, the camera can be arranged on a crawler prior to the carrying out of the inspection so that it is arranged largely in the center of the pipe if the pipe or sewer diameter is known. However, the disadvantage here is that the camera is no longer arranged in the center of the pipe if there are deposits on the sewer floor or if the sewer diameter changes.

With inspection systems in which the camera is arranged on a lifting unit of a crawler, for example, an operator of the system can control the lifting unit during an inspection in order to align the camera largely in the center of the pipe. However, this is complex and prone to errors and the operator of the system must take into account the wheel diameter of the crawler, distance between the wheels, pipe diameter, camera size and dimensions of the lifting unit. This can significantly impair and delay the quality of an inspection. If inspections are carried out several times in succession in one and the same sewer, it is difficult to compare inspection results, in particular image and/or video recordings, if the image and/or video recordings originate from different positions in the sewer pipe. Correct positioning of a camera in the sewer requires special skills and great experience on the part of the operator. There is also a risk of the camera hitting the sewer wall during the positioning process, which can lead to damage to the camera or even the entire inspection system.

If, on the other hand, an inspection unit that is not a camera has to be aligned in the center of the pipe, even the possibility of "visual" alignment is eliminated. Therefore, such inspection units have to be aligned accordingly before the inspection, with the disadvantages described above.

OBJECT OF THE INVENTION

Therefore, the object of the invention is to provide solutions that enable simpler, more rapid and at the same time safer positioning of an inspection unit in the sewer.

SOLUTION ACCORDING TO THE INVENTION

This object is achieved by a system and a method according to the independent claims. Advantageous embodiments are defined in the respective dependent claims.

Accordingly, a sewer inspection and/or maintenance system is provided, which comprises at least:
- a sensor system, which is adapted to detect at least three distances between a predetermined first point in the sewer pipe and the sewer wall of the sewer pipe, wherein the at least three distances are detected starting from the predetermined first point in different directions relative to the sewer wall,
- a processing unit, which is adapted
  determining a diameter of the sewer pipe and a predetermined second point in the sewer pipe, preferably the center point of the sewer pipe, based on the distances detected by the sensor system,
  determining a horizontal offset and a vertical offset between the predetermined first point and the predetermined second point of the sewer pipe based on the determined diameter and the detected distances, and
- a positioning unit, which is operatively coupled to the processing unit and which is adapted to correct the position of an inspection unit in the sewer pipe by the horizontal offset and by the vertical offset.

Thus, a camera or other inspection unit, for example, can always be precisely aligned at a predetermined position in the sewer pipe, for example in the center of the pipe, without manual intervention. The advantage here is that alignment can be achieved much more rapidly and more precisely than would be possible with manual alignment.

If a plurality of inspection processes are carried out in succession, it can also be ensured that, for example, image and/or video recordings are always made from exactly the same position (for example, from the center of the sewer), so that the image and/or video recordings made in succession can be compared with one another particularly easily and without errors. This also applies if different camera systems and/or different crawlers are used for the different inspection processes.

The inspection unit can be a camera, wherein the predetermined first point is the center point of a lens of the camera. Thus, the optical axis of the camera can be aligned in the center of the pipe.

The inspection unit, such as the camera, can be arranged on the positioning unit, wherein the positioning unit has
- a first actuating device, which is adapted to move the inspection unit by the horizontal offset, and
- a second actuating device, which is adapted to move the inspection unit by the vertical offset.

In one embodiment of the invention, the positioning unit can be a lifting arm, at the free end of which the inspection unit is arranged, wherein the free end of the positioning unit preferably is movable in the vertical and horizontal directions in order to correct the position of the inspection unit in the vertical and horizontal directions.

A method for autonomously positioning an inspection unit in a sewer pipe is also provided, wherein the method comprises at least:
- a first step for detecting at least three distances between a predetermined first point in the sewer pipe and the sewer wall of the sewer pipe, wherein the at least three distances are detected starting from the predetermined first point in different directions relative to the sewer wall, a second step for determining a diameter of the sewer pipe and a predetermined second point in the sewer pipe, preferably the center point of the sewer pipe, wherein the diameter and the predetermined second point are determined based on the detected distances, a third step for determining a horizontal offset and a vertical offset between the predetermined first point and the predetermined second point of the sewer pipe, wherein the third step is carried out based on the determined diameter and the detected distances, and a fourth step for correcting the position of the inspection unit in the sewer pipe by the horizontal offset and by the vertical offset.

A positioning unit can be provided for correcting the position of the inspection unit in the sewer pipe, wherein the positioning unit has a first actuating device, with which the inspection unit is moved by the horizontal offset, and a second actuating device, with which the inspection unit is moved by the vertical offset.

A sensor system can be used for detecting the at least three distances.

The sensor system can be arranged offset by a predetermined second horizontal offset and by a predetermined second vertical offset from the predetermined first point outside the inspection unit (this also applies to the system described above), wherein prior to the fourth step the horizontal offset is corrected by the second horizontal offset and the vertical offset is corrected by the second vertical offset.

As a result, the sensor system does not necessarily have to be arranged directly on the camera or integrated into the camera.

In one embodiment of the invention, the first step, the second step, the third step and the fourth step can be carried out at regular intervals, preferably continuously, in order to correct the position of the inspection unit in the sewer pipe at regular intervals, preferably continuously.

Thus, during the entire inspection process, it is ensured that the camera is always aligned to the center of the pipe, even if the pipe diameter changes, for example.

BRIEF DESCRIPTION OF THE FIGURES

Further details and features of the invention as well as specific, particularly advantageous exemplary embodiments of the invention are apparent from the following description in conjunction with the drawings. In the figures.

DETAILED DESCRIPTION OF THE INVENTION

Figure 1:
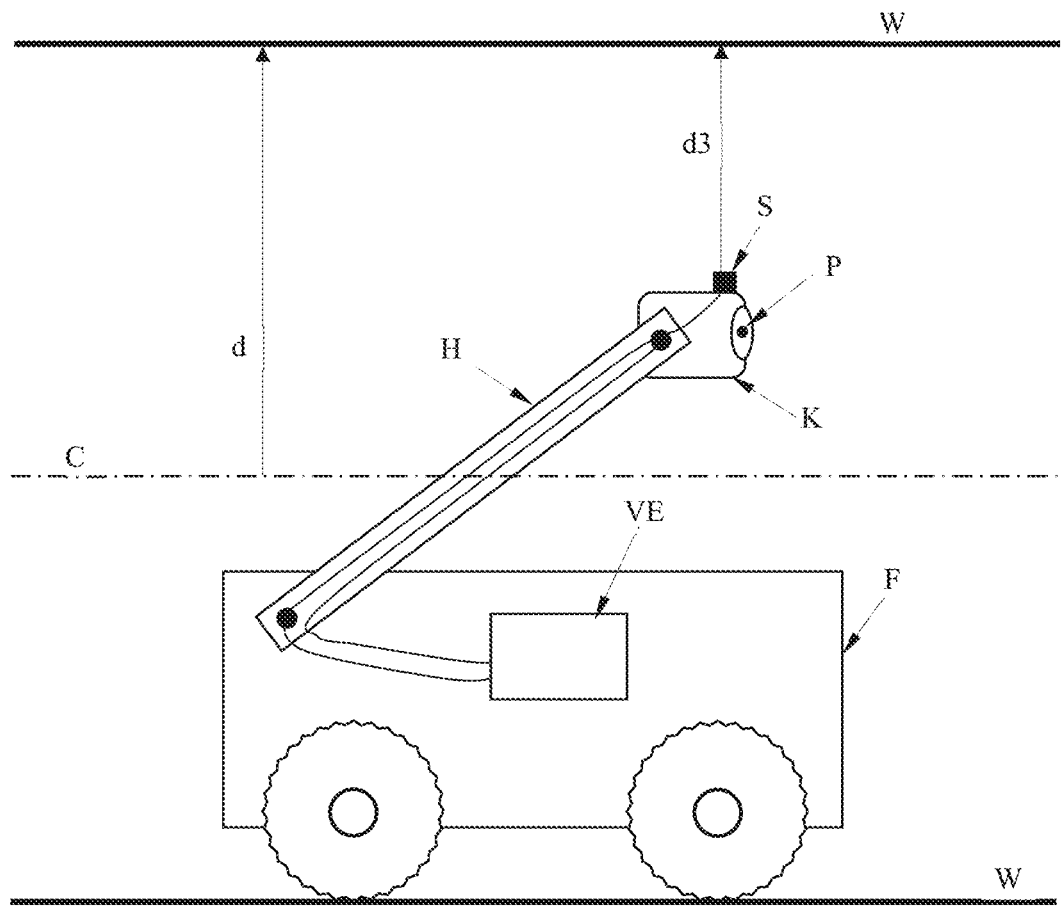
FIG. 1 shows a schematic inspection system according to the invention in a sewer (side view)
Figure 2:
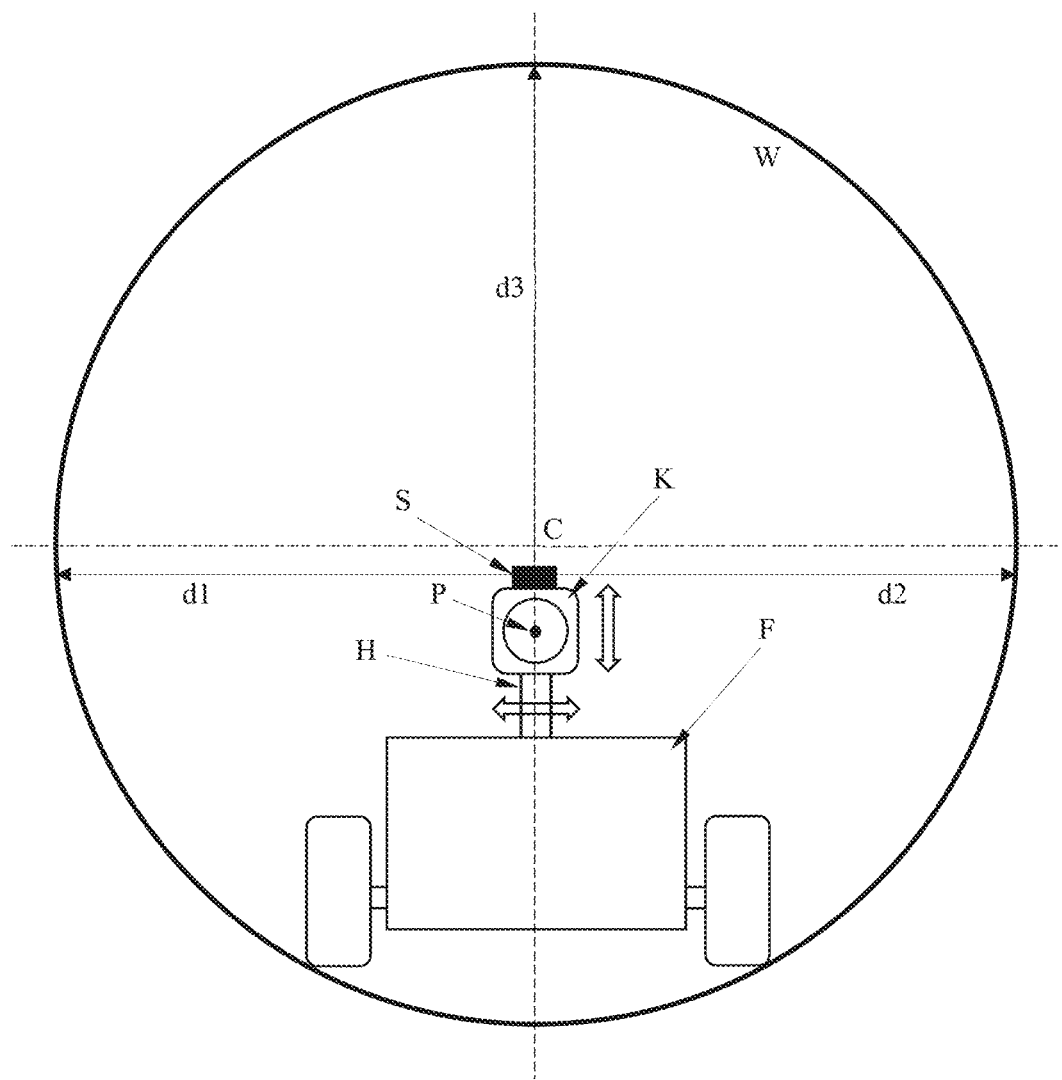
FIG. 2 shows a schematic inspection system according to the invention in a sewer (view from the front)

FIG. 1 shows a side view of a schematic inspection system according to the invention in a sewer that is bounded by the sewer wall W. FIG. 2 shows a view from the front of a schematic inspection system according to the invention in a sewer.

A crawler F of an inspection system, on which a lifting unit H is arranged, is located in the sewer. A camera K (or a camera head), which can be designed as an image or video camera, is arranged at the free end of the lifting unit H.

FIG. 1 and FIG. 2 show the center C of the sewer. As can be seen in FIG. 1, the camera is arranged or positioned above the center C of the sewer. In FIG. 2, the camera is arranged below the center C of the sewer. In both cases, the accommodation of the camera is not carried out in the center of the pipe.

A sensor system S, which is arranged here on the camera K, is provided for aligning the camera K in the center of the pipe or sewer. The sensor system S is coupled here via a data line to a processing unit VE, which is arranged in the crawler. However, the processing unit VE can also be arranged in the camera or in the sensor system itself. However, the coupling of the sensor system S to the processing unit VE can also be carried out wirelessly; i.e., data provided by the sensor system can also be transferred wirelessly to the processing unit VE.

Figure 3:
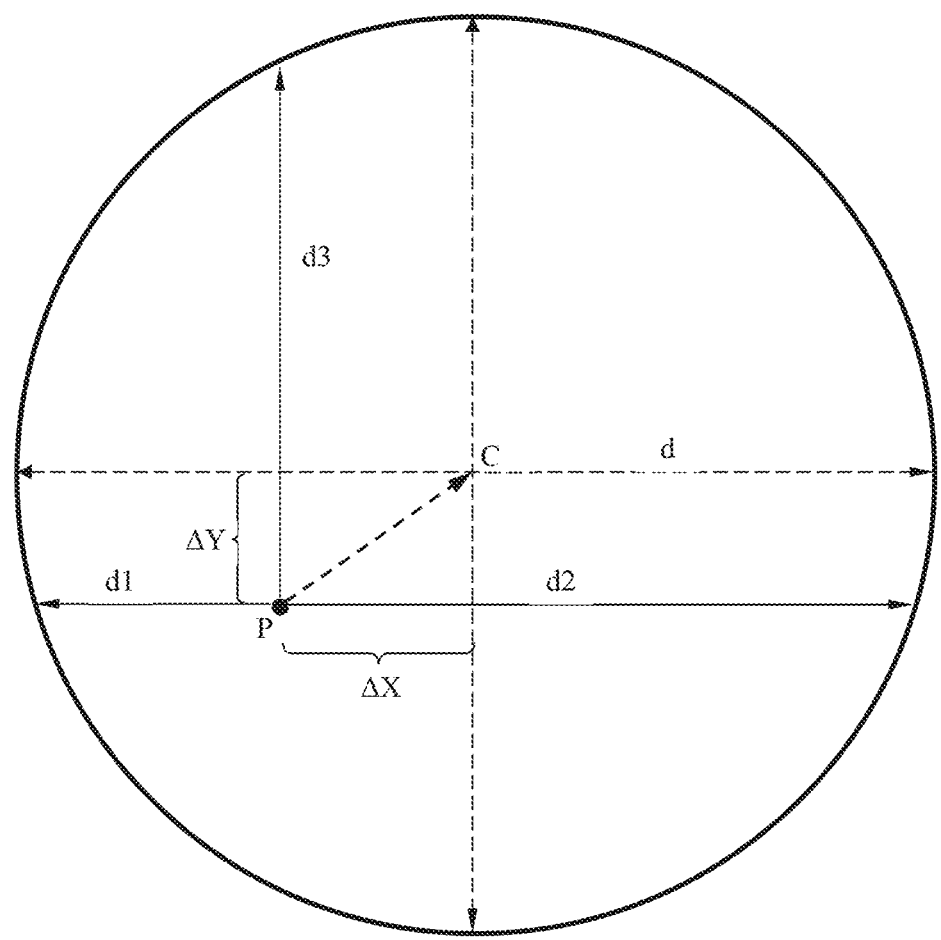
FIG. 3 shows a schematic representation of a point P to be corrected in a sewer, for illustrating the method according to the invention.

The sensor system S is adapted to detect at least three distances d1; d2; d3 between a predetermined first point P (which here is the center point of the camera lens) in the sewer pipe and the sewer wall W of the sewer pipe, wherein the at least three distances are detected starting from the predetermined first point P in different directions relative to the sewer wall, as described in more detail in FIG. 3. The sensor system S can have laser, ultrasonic or infrared sensors, which are used to determine the distances to the sewer wall. Other sensor technologies can also be used within the meaning of the invention.

In FIG. 1 and FIG. 2, the predetermined point P, to which the three distances are detected, is located outside the sensor system S. According to the invention, the distances are detected in relation to the predetermined point P; i.e., the offset of the sensor system to the predetermined point P is taken into account when detecting the distances, as described in more detail with reference to FIG. 4.

The detected distances d1; d2; d3 are transferred to the processing unit VE, which uses them to calculate the diameter d of the sewer pipe, as also explained in more detail with reference to FIG. 3.

From the detected distances d1; d2; d3 and the calculated diameter d, the processing unit VE determines a predetermined second point C in the sewer pipe, which is preferably the center point of the sewer pipe. However, it can also be any other point in the sewer pipe if, for example, the camera is to always be aligned at this other point.

Based on the determined diameter d and the detected distances d1; d2; d3, the processing unit VE determines a horizontal offset $\Delta X$ and a vertical offset $\Delta Y$ between the predetermined first point P and the predetermined second point C of the sewer pipe. If the predetermined second point C is the center of the sewer pipe, the processing unit VE determines a horizontal offset $\Delta X$ and a vertical offset $\Delta Y$ by which the camera position in the sewer must be corrected in order to be aligned in the center of the sewer or pipe.

The two offsets $\Delta X$ and $\Delta Y$ are made available to a positioning unit H, which in this case is a lifting arm, which then carries out a movement corresponding to the two offsets (up/down and/or left/right), as a result of which the camera arranged on the positioning unit is aligned in the center of the sewer or pipe. After alignment, the predetermined first point P and the predetermined second point C coincide.

With the example shown in FIG. 2, the horizontal offset is zero and the vertical offset is greater than zero. That is, the positioning unit H only needs to be moved upwards in order to position the camera in the center of the pipe.

In principle, however, the positioning unit is designed so that the camera can move upwards, downwards, to the left and to the right. For this purpose, the positioning unit can have corresponding actuating means (for example, servomotors).

FIG. 3 shows a schematic representation of a point P to be corrected in a sewer, for illustrating the method according to the invention.

The method according to the invention substantially comprises four steps:

Step S1: Detection of at least three distances d1; d2; d3 between a predetermined first point P in the sewer pipe and the sewer wall W of the sewer pipe, wherein the at least three distances are detected starting from the predetermined first point P in different directions relative to the sewer wall.

Step S2: Determining the diameter d of the sewer pipe and a predetermined second point C in the sewer pipe based on the distances d1; d2; d3 detected in step S1. The predetermined second point C can be the center point of the sewer pipe. The diameter and the second point C can be determined using the circumcircle of the triangle defined by the three points (given by the three distances). Other calculation rules can also be used within the meaning of the invention.

After step S2, the second point C (for example, the center point of the pipe), the three distances d1; d2; d3 to the sewer wall W and thus also the first point P in the sewer pipe are known.

Step S3: Based on the determined diameter d and the detected distances d1; d2; d3, i.e., based on the two points P and C, a horizontal offset $\Delta X$ and a vertical offset $\Delta Y$ between the point P and the point C can now be calculated, wherein the two offsets specify correction values by which the position of the camera in the sewer must be corrected so that the camera is aligned in the center of the pipe.

Step S4: Correction of the position of the inspection unit (for example, the camera) in the sewer pipe by the horizontal offset $\Delta X$ and by the vertical offset $\Delta Y$. The two offsets are made available to the positioning unit, which can then carry out or carries out the corresponding corrections in the X (left/right) and Y (up/down) directions.

In FIG. 3, point P represents the optical center (optical axis) of the camera and point C represents the center of the sewer. With the method according to the invention, the optical center P of the camera is thus displaced to the center C of the sewer, so that the two points P and C coincide.

Figure 4:
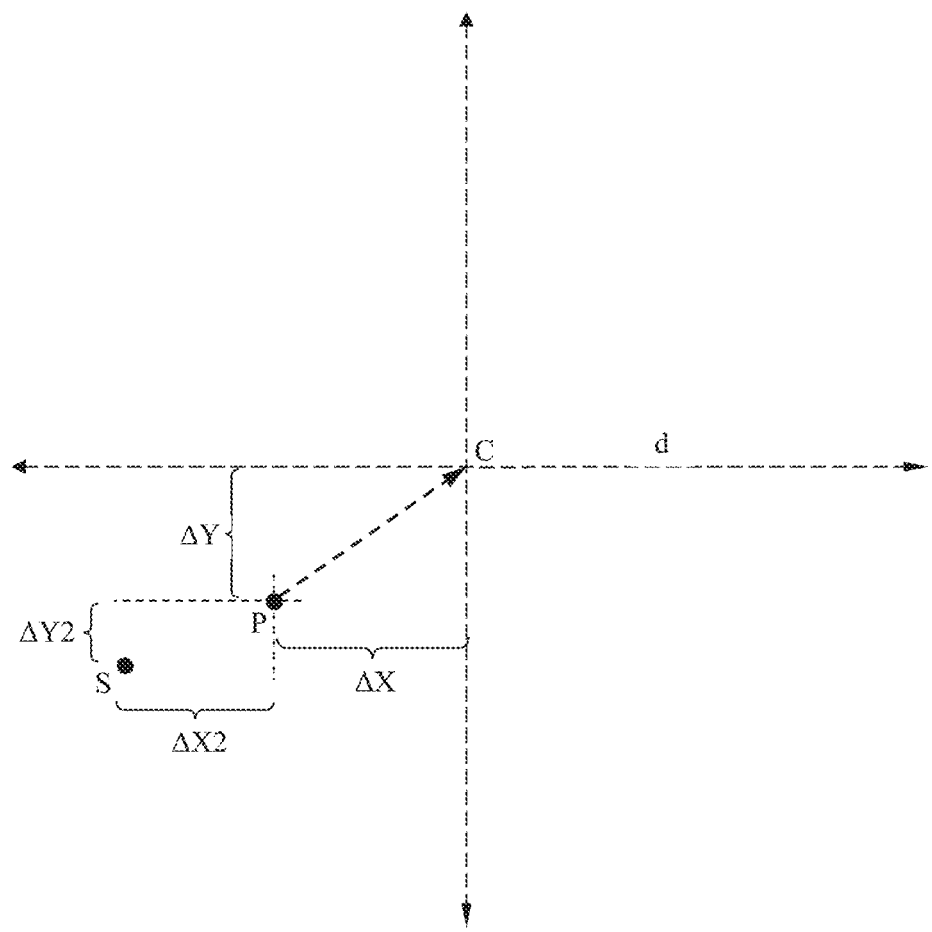
FIG. 4 a schematic representation of a point P to be corrected in a sewer, for illustrating an alternative embodiment of the method according to the invention.

FIG. 4 shows a schematic representation of a point P to be corrected in a sewer, for illustrating an alternative embodiment of the method according to the invention.

In the representation shown in FIG. 4, it is assumed that the sensor system S is not arranged on the camera but is arranged, for example, on the crawler. The sensor system is arranged on the crawler such that it can detect the three distances d1; d2; d3. In FIG. 4, point P represents the optical center (optical axis) of the camera, point C the center of the sewer and point S the position of the sensor system. Therefore, the sensor system is arranged offset from point P by a second horizontal offset $\Delta X2$ and a second vertical offset $\Delta Y2$. These two offsets $\Delta X2$ and $\Delta Y2$ must be taken into account when calculating the two offsets $\Delta X$ and $\Delta Y$, so that the camera is positioned correctly at point C. Without taking into account the two offsets $\Delta X2$ and $\Delta Y2$, the camera would be positioned offset to point C by the offsets $\Delta X2$ and $\Delta Y2$ after the correction of the camera position.

During an inspection, the relative position of the camera to the sensor system can change in a system with which the sensor system does not move with the camera. This means that the offsets $\Delta X2$ and $\Delta Y2$ can change during an inspection. However, the changes to these offsets $\Delta X2$ and $\Delta Y2$ are known to the processing unit VE, since the processing unit VE itself corrects the position of the camera. Thus, the processing unit VE can take into account the correct offsets $\Delta X2$ and $\Delta Y2$ at any time when calculating the two offsets $\Delta X$ and $\Delta Y$. In the event that the camera position is changed manually, for example, these changes must be made known to the processing unit VE in order to be able to calculate the correct offsets $\Delta X2$ and $\Delta Y2$.

In one embodiment of the invention, the two offsets $\Delta X$ and $\Delta Y$ can be determined continuously. As soon as one of the two or both offsets $\Delta X$, $\Delta Y$ are different from zero, a correction of the positioning of the camera can be performed. This ensures that the camera is positioned or aligned in the center of the pipe during the entire inspection process.

Examples have been described above with which the correction of the positioning of the camera is carried out so that the camera is always aligned in the center of the pipe, i.e., is always located at point C.

However, according to one aspect of the invention, it is also possible to automatically position the camera so that it is always located outside the center C of the pipe by a specific offset. This specific offset only needs to be taken into account when calculating the two offsets $\Delta X$ and $\Delta Y$. This makes it possible, for example, to always position the camera 20 cm to the left and 30 cm above the pipe center point C during an inspection process.

The system according to the invention uses a sensor-based diameter measurement to calculate the necessary vertical and horizontal adaptations or corrections to the camera position, which are transmitted to a mechanical element for supporting the camera movement, such as a lifting unit.

The invention thus provides an autonomous camera positioning system for sewer inspections. The method according to the invention simplifies the positioning process, eliminates the need for manual calculations and adaptations and increases the accuracy and efficiency of the inspection.

Special advantages of the invention are:

Improved accuracy: The sensor-based diameter measurement and automatic calculations reduce the risk of human error, which leads to more accurate camera positioning and better inspection results.

Consistency: The invention standardizes the camera positioning process and provides consistent results for different inspection scenarios and operators, making it easier to compare inspection results from different inspections or inspection teams.

Time efficiency: The elimination of manual calculations and adaptations speeds up the camera positioning process, saving time and reducing labor costs, in particular on large or complex pipe inspection projects.

Less reliance on operator skill: Fully autonomous positioning of the camera reduces reliance on operator skill and experience, which leads to more consistent inspection results.

Increased adaptability: The invention makes it possible to work with different sensor types and can be easily adapted to different pipe sizes and shapes.

Reduced risk of equipment damage: Accurate and precise camera positioning minimizes the risk of damage to the camera or other inspection equipment, which can reduce repair or replacement costs and project delays.

The invention claimed is:

1. A sewer inspection and/or maintenance system, comprising:
   a sensor system (S), which is adapted to detect at least three distances (d1; d2; d3) between a predetermined first point (P) in a sewer pipe and a sewer wall (W) of the sewer pipe, wherein the at least three distances are detected starting from the predetermined first point in different directions relative to the sewer wall,
   a processing unit (VE), which is adapted for:
      determining a diameter (d) of the sewer pipe and a predetermined second point (C) in the sewer pipe, preferably a center point of the sewer pipe, based on the distances (d1; d2; d3) detected by the sensor system, and
      determining a horizontal offset ($\Delta X$) and a vertical offset ($\Delta Y$) between the predetermined first point (P) and the predetermined second point (C) of the sewer pipe based on the determined diameter (d) and the detected distances (d1; d2; d3), and
   a positioning unit (H), which is operatively coupled to the processing unit and which is adapted to correct the position of an inspection unit in the sewer pipe by the horizontal offset ($\Delta X$) and by the vertical offset ($\Delta Y$).

2. The system according to claim 1, wherein the inspection unit is a camera and wherein the predetermined first point (P) is the center point of a lens of the camera.

3. The system according to claim 1, wherein the inspection unit is arranged on the positioning unit and wherein the positioning unit has
   a first actuating device, which is adapted to move the inspection unit by the horizontal offset ($\Delta X$), and
   a second actuating device, which is adapted to move the inspection unit by the vertical offset ($\Delta Y$).

4. The system according to claim 1, wherein the positioning unit is a lifting arm, at the free end of which the inspection unit is arranged, wherein preferably the free end of the positioning unit is movable in the vertical and horizontal directions.

5. A method for autonomously positioning an inspection unit in a sewer pipe, wherein the method comprises:
   a first step (S1) for detecting at least three distances (d1; d2; d3) between a predetermined first point (P) in the sewer pipe and a sewer wall of the sewer pipe, wherein the at least three distances are detected starting from the predetermined first point in different directions to the sewer wall,
   a second step (S2) for determining a diameter (d) of the sewer pipe and a predetermined second point (C) in the sewer pipe, preferably the center point of the sewer pipe, wherein the diameter and the predetermined second point are determined based on the detected distances (d1; d2; d3),
   a third step (S3) for determining a horizontal offset ($\Delta X$) and a vertical offset ($\Delta Y$) between the predetermined first point (P) and the predetermined second point (C) of the sewer pipe based on the determined diameter (d) and the detected distances (d1; d2; d3), and
   a fourth step (S4) for correcting the position of the inspection unit in the sewer pipe by the horizontal offset ($\Delta X$) and by the vertical offset ($\Delta Y$).

6. The method according to claim 5, wherein the inspection unit is a camera and wherein the center point of a lens of the camera is used as the predetermined first point (P).

7. The method according to claim 6, wherein a positioning unit is provided for correcting the position of the inspection unit in the sewer pipe, wherein the positioning unit has
   a first adjusting device, with which the inspection unit is moved by the horizontal offset ($\Delta X$), and
   a second actuating device, with which the inspection unit is moved by the vertical offset ($\Delta Y$).

8. The method according to claim 5, wherein a sensor system is used for detecting the at least three distances (d1; d2; d3).

9. The method according to claim 8, wherein the sensor system(S) is arranged offset by a predetermined second horizontal offset ($\Delta X2$) and by a predetermined second vertical offset ($\Delta Y2$) from the predetermined first point (P) outside the inspection unit, wherein prior to the fourth step (S4)
   the horizontal offset ($\Delta X$) is corrected by the second horizontal offset ($\Delta X2$) and
   the vertical offset ($\Delta Y$) is corrected by the second vertical offset ($\Delta Y2$).

10. The method according to claim 5, wherein the first step (S1), the second step (S2), the third step (S3) and the fourth step (S4) are carried out at regular intervals, preferably continuously, in order to correct the position of the inspection unit in the sewer pipe at regular intervals, preferably continuously.

* * * * *